Nov. 5, 1940.   R. G. LE TOURNEAU   2,220,655
POWER CONTROL UNIT
Filed May 5, 1939   3 Sheets-Sheet 3
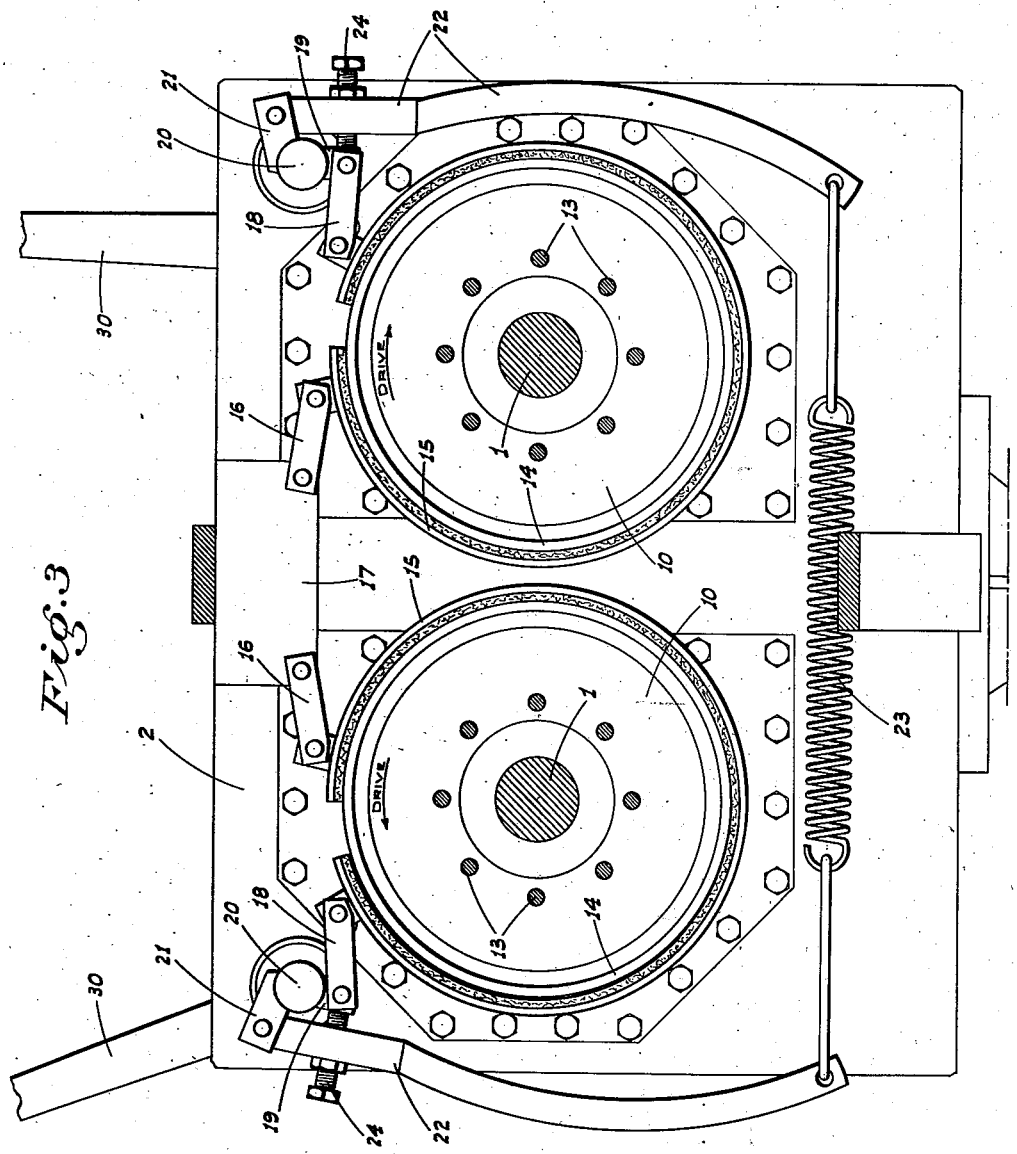

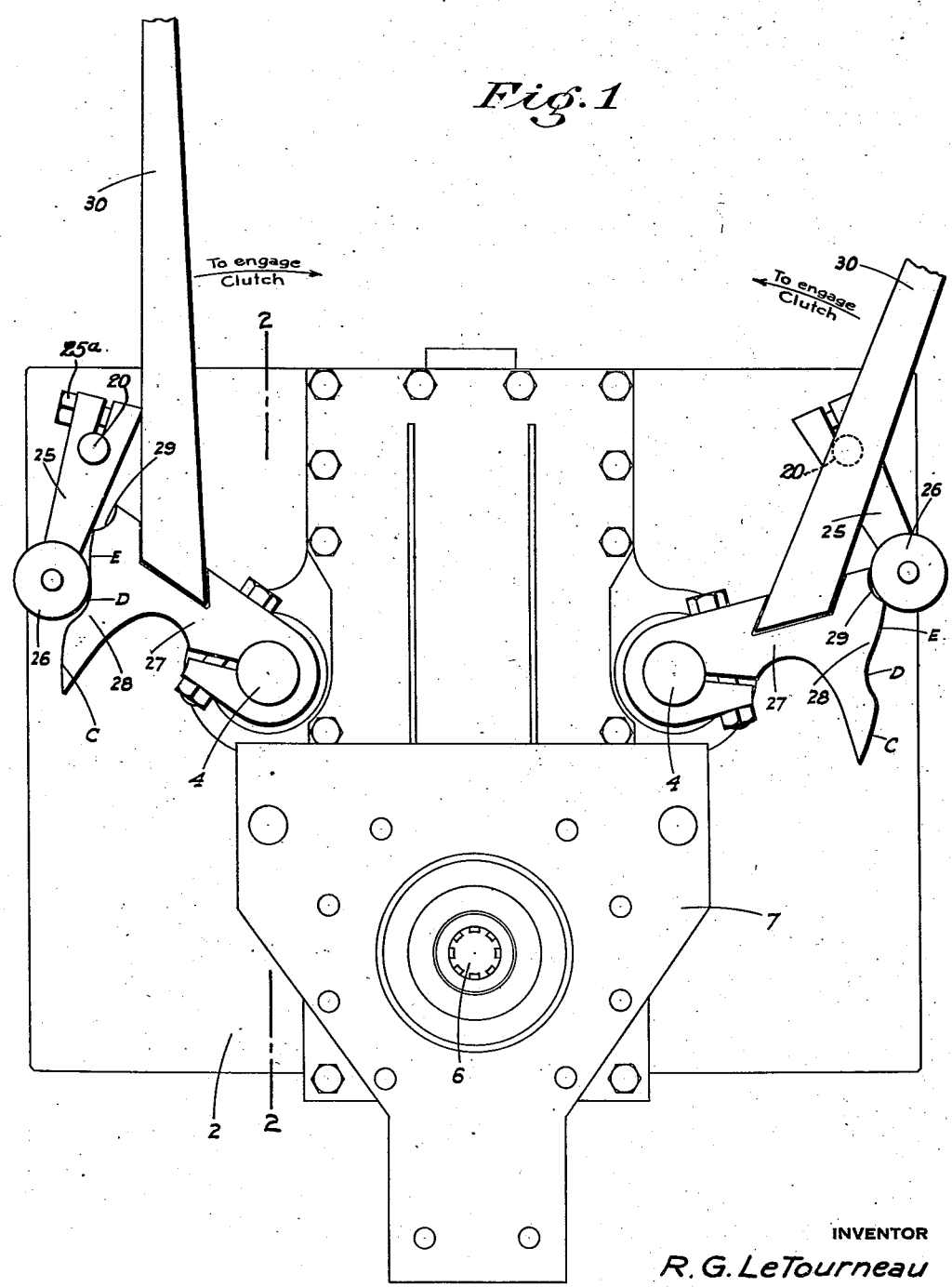

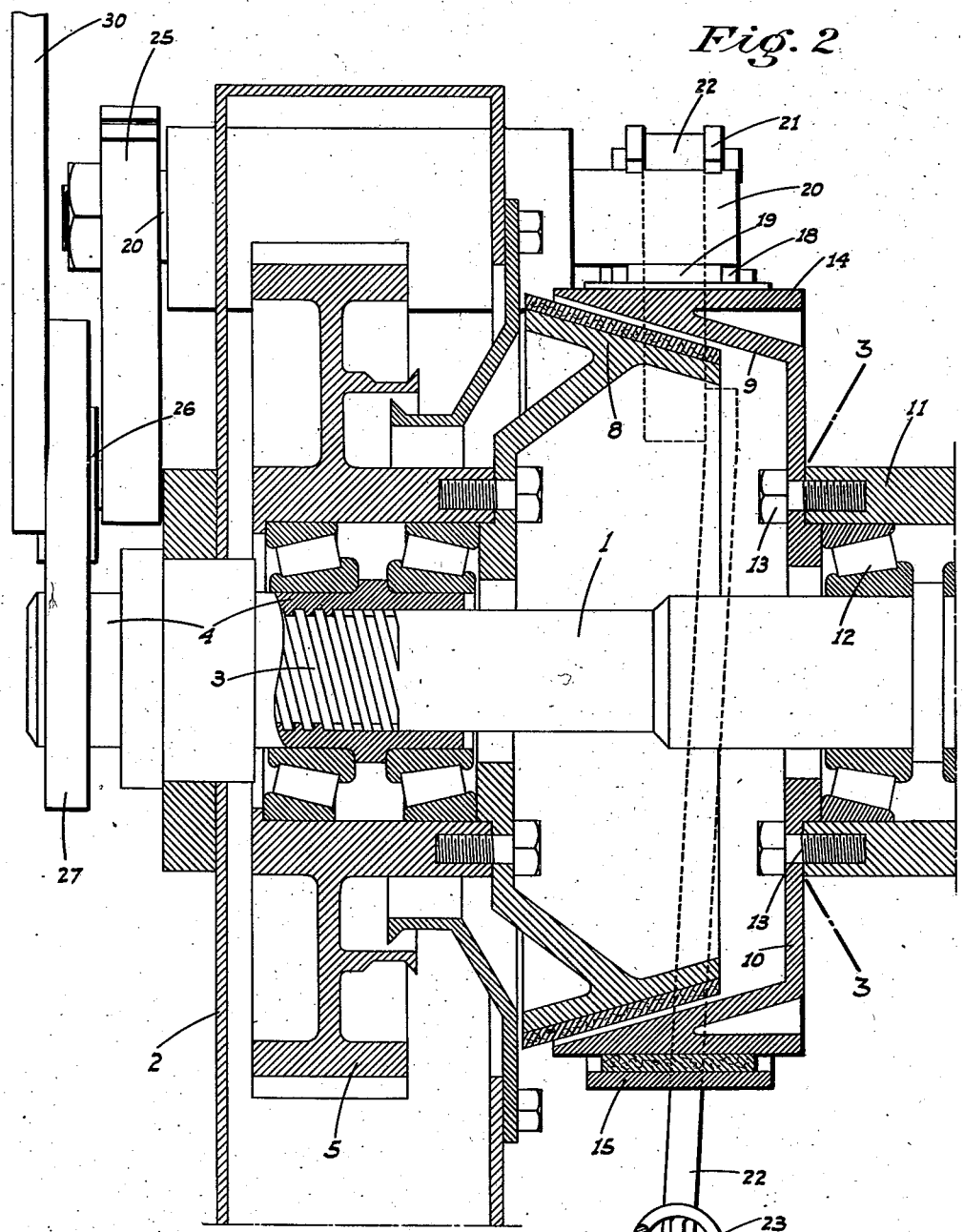

Patented Nov. 5, 1940

2,220,655

UNITED STATES PATENT OFFICE 2,220,655

POWER CONTROL UNIT

Robert G. Le Tourneau, Peoria, Ill., assignor to R. G. Le Tourneau, Inc., a corporation Application May 5, 1939, Serial No. 271,907

7 Claims. (Cl. 192—17)

This invention relates to power control units or power hoists, such as are mounted on tractors to control the operating cables of implements drawn by the tractors.

The present invention represents improvements over the structure of my Patent No. 1,912,645 dated June 6, 1933, particularly with respect to the releasing of the brake. In the original, as well as in the present unit, the brake is of the self-setting type, and in the previous structure, the brake was only definitely released after the clutch was disengaged. When the clutch was engaged and the brake drum driven, the brake automatically released itself to a certain extent, but still had a certain frictional contact with the drum so that heat was generated and somewhat rapid wear resulted.

It is therefore the principal object of the present invention to eliminate this objectionable feature by providing a brake release means arranged to definitely release the brake when the clutch is engaged. At the same time, the brake remains automatically set when the clutch is first disengaged, and can also be fully released with the clutch in such position, as before.

Another object is to so arrange and mount the cable drum in connection with the other parts of the unit that drums of different length can be mounted on any unit with but few changes being necessary to any of said other parts.

These objects I accomplish by means of such structure and relative arrangement of parts as will fully appear by a perusal of the following specification and claims.

In the drawings similar characters of reference indicate corresponding parts in the several views:

Figure 1 is a front end elevation of a two drum unit, showing the adjacent brake control parts in position with one brake set and the clutch disengaged, and with the other brake fully released and with the clutch likewise disengaged.

Figure 2 is a longitudinal section on line 2—2 of Fig. 1.

Figure 3 is a transverse section, looking forward, on line 3—3 of Fig. 2.

Referring now more particularly to the characters of reference on the drawings, the construction of the present unit in the main is substantially the same as that of Patent No. 1,912,645, and comprises a pair of fixed horizontal and transversely spaced shafts 1, which project through a fixed housing 2. Each shaft at its forward end is provided with a multiple thread 3 engaged by a rotatable tapped sleeve 4 projecting from the front end of the housing. The sleeve turnably supports a driving gear 5 within the housing. The gears of the two shafts intermesh as shown in said patent, one being gear connected with a drive shaft 6 mounted in the removable neck 7 attached to the housing and adapted for connection with the take-off shaft of a tractor. The gear connection is accomplished either as shown in the patent, or as shown in my copending application for Patent Ser. No. 270,146, filed April 26, 1939.

Each gear 5 has a male rearwardly facing cone clutch member 8 secured therewith and disposed rearwardly of the housing. This member cooperates with a female cone clutch member 9 having a rear end wall 10 surrounding shaft 1. This wall forms the forward cable retaining flange of the cable drum barrel 11, which is turnably supported on the shaft 1 rearwardly of wall 10 by bearings 12, and which is removably secured to said wall by cap screws 13 inserted through the forward face of said wall. By this arrangement, drum barrels of different lengths may be mounted in connection without having to replace the clutch member also, it being only necessary to use a shaft 1 of corresponding length and a different shaft supporting plate or bracket at the rear end of the unit.

A brake drum 14 is fixed rigid with and extends about the periphery of each clutch member 9, the drum 14 being engaged by a split band 15. The band at one end is connected by a link 16 with an anchor or plate 17 rigid with housing 2; the link being disposed substantially tangent to the brake drum and extending therefrom in a direction opposite to the direction of driven rotation of the brake drum and clutch unit as indicated.

The other end of the band is connected to a link 18 also substantially tangent to the brake drum but extending therefrom in the direction of driven rotation of said drum. This link 18 is connected at its outer end to a short arm 19 depending from a rotary shaft 20 mounted in the housing 2 laterally out from the adjacent shaft 1 and extending through said housing.

Spaced arms 21 project laterally out from shaft 20 in planes on opposite sides of arm 19, and swively support a depending link 22 which extends clear of the outer side of the adjacent brake band to a termination below the same. At their lower ends, both links 22 are connected by a tension spring 23, although actually each link could have its own spring. An adjustment screw 24 is threaded through the link 22 and bears against the arm 22, so that upon advancing or retracting said screw, the brake applying pressure derived from spring 23 may be increased or reduced respectively, as wear or operating conditions may require. With this arrangement of parts, it will be seen that rotation of shaft 20 in a direction to pull on links 18 will positively release the brake in opposition to the spring 23.

In order to thus rotate either shaft 20 selectively in conjunction with the operation of the corresponding clutch, control mechanisms are mounted at the front end of housing 2. Each mechanism comprises a depending arm 25 adjustably secured on the forward end of shaft 20, said arm on its lower end carrying a forwardly facing roller 26. Adjustment of arm 25 about shaft 20 may be effected by reason of the fact that as shown, each arm 25 is split radially out from the shaft to its adjacent end, the split portions of the arm being drawn into releasable clamping engagement with the shaft by a bolt 25a. Adjustably fixed on the adjacent shaft sleeve 4 is arm 27, extending laterally out or toward arm 25, and located in the plane of roller 26. The outer edge of this arm 27, above and below a substantially central depression D, is formed as a roller engaging cam 28. The depression D clears the roller and allows the brake to set itself without restraint. The cam edge E above said depression is disposed relative to the axis of sleeve 4 to continuously rotate arm 25 as arm 27 is lowered until the brake band is fully released and well clear of the brake drum. The roller 26 then drops into a holding socket 29 at the upper end of cam edge E, so that the brake may be maintained in the full release position.

Below the cam depression D, the cam edge C is disposed to rotate shaft 20 only sufficient to loosen the brake, and is concentric with sleeve 4 so that said shaft will be rotated only such amount regardless of the amount of movement of arm 27.

An operating lever 30 projects upwardly from arm 27; the cooperating sleeve and shaft threads being so arranged that with movement of the lever in the direction of the opposite side of the housing 2, the sleeve will be advanced along the shaft 1, to engage the clutch. The arm 27 is set on the sleeve so that the depression D alines with roller 26 just as the clutch becomes fully disengaged. Also the arm 27 is set so that the brake is released just before the clutch takes hold, and by reason of the fact that there is then no further movement of shaft 20 (with the accompanying tensioning of spring 23) no extra effort is then required to shift lever 30 to a full clutch engaging position. The extent of release of the brake may be altered to suit by adjusting arm 25 on shaft 20, as will be evident.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a power control unit, a normally disengaged clutch and a normally set brake; means to release the brake including a rotary shaft whose rotation in one direction effects the brake release, an arm projecting from the shaft and a cam engaging element on the outer end of the arm; means to actuate the clutch including a lever turnable in both directions from a neutral position about an axis parallel to that of said shaft and offset from said shaft and the arm, and a cam member rigid with the lever and disposed to engage and press against said element at a point thereon such that the shaft will be rotated in a brake release direction upon movement of the lever in either direction from said neutral position.

2. In a power control unit, a normally disengaged clutch and a normally set brake; means to release the brake including a rotary shaft whose rotation in one direction effects the brake release, an arm projecting from the shaft and a cam engaging element on the outer end of the arm; means to actuate the clutch including a lever turnable in one direction to disengage the clutch and movable in said one direction beyond a clutch disengaging position, the axis of rotation of the lever being parallel to that of the shaft and being offset from said shaft and the arm thereon, and a cam member rigid with the lever and having a cam edge disposed to engage and press against said element at a point thereon such that the shaft will be rotated in said one direction upon movement of the lever in said one direction beyond a clutch disengaging position; said edge having a depression therein to receive and form a holding seat for the element when the lever has turned to substantially its limit of movement in said one direction.

3. In a power control unit, a normally disengaged clutch and a normally set brake; means to release the brake including a rotary shaft whose rotation in one direction effects the brake release, an arm projecting from the shaft and a cam-engaging element on the outer end of the arm; means to engage the clutch including a lever turnable in one direction from a neutral position about an axis parallel to that of said shaft and offset from the shaft and arm, a cam rigid with the lever and having an edge disposed to engage and press against said element at a point thereon such that the shaft will be rotated in said one direction upon movement of the lever in said one direction from its neutral position.

4. In a power control unit, a normally disengaged clutch and a normally set brake; means to release the brake including a member rotatable in one direction to effect the brake release, an arm rigid with said member and extending substantially radially of the axis of rotation of said member and a cam engaging element on the outer end of the arm; means to actuate the clutch including a lever turnable in both directions from a neutral position about an axis parallel to said first named axis and offset therefrom and from the arm and a cam rigid with the lever and disposed to engage and press against said element at a point thereon such that the member will be rotated in a brake release direction upon movement of the lever in either direction from said neutral position.

5. In a power control unit, a normally disengaged clutch and a normally set brake; means to release the brake including a member rotatable in one direction to effect the brake release, an arm rigid with the member and a cam engaging element on the outer end of the arm; means to engage the clutch including a lever turnable in one direction from a neutral position about an axis parallel the axis of rotation of said member and offset from said last named axis and the arm, and a cam rigid with the lever and having an edge disposed to engage and press against said element at a point thereon such that the member will be rotated in said one direction upon movement of the lever in said one direction from its neutral position.

6. A structure as in claim 5, in which said cam edge, for the major portion of its extent, is concentric with the axis of rotation of the lever.

7. In a power control unit, a normally disengaged clutch and a normally set brake; means to release the brake including a member rotatable in one direction to effect the brake release, an arm rigid with the member and a cam engaging element on the outer end of the arm; means to engage the clutch including a lever turnable in one direction from a neutral position and offset from the arm, and a cam rigid with the lever and having an edge disposed to engage and press against said element at a point thereon such that the member will be rotated in said one direction upon movement of the lever in said one direction from its neutral position.

ROBERT G. LE TOURNEAU.